US011954871B2

United States Patent
Lee

(10) Patent No.: US 11,954,871 B2
(45) Date of Patent: Apr. 9, 2024

(54) APPARATUS AND METHOD FOR ACQUIRING COORDINATE CONVERSION INFORMATION

(71) Applicant: SK TELECOM CO., LTD., Seoul (KR)

(72) Inventor: Seongsoo Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 585 days.

(21) Appl. No.: 17/267,696

(22) PCT Filed: May 31, 2019

(86) PCT No.: PCT/KR2019/006557
§ 371 (c)(1),
(2) Date: Feb. 10, 2021

(87) PCT Pub. No.: WO2020/036295
PCT Pub. Date: Feb. 20, 2020

(65) Prior Publication Data
US 2021/0295060 A1  Sep. 23, 2021

(30) Foreign Application Priority Data
Aug. 17, 2018  (KR) .................. 10-2018-0096210

(51) Int. Cl.
*G06T 7/73* (2017.01)
*G01S 13/931* (2020.01)
(Continued)

(52) U.S. Cl.
CPC ............. *G06T 7/33* (2017.01); *G01S 13/931* (2013.01); *G01S 17/89* (2013.01); *G06T 7/73* (2017.01); *G06V 20/588* (2022.01); *G06T 2207/10028* (2013.01); *G06T 2207/30256* (2013.01)

(58) Field of Classification Search
CPC ... G06T 7/33; G06T 7/73; G06T 2207/10028; G06T 2207/30256; G06T 2207/30252;
(Continued)

(56) References Cited

U.S. PATENT DOCUMENTS 10,668,925 B2 * 6/2020 Zhu ..................... B60W 30/12
11,402,851 B2 * 8/2022 Stein ..................... G01S 19/42
(Continued)

FOREIGN PATENT DOCUMENTS

KR  10-2010-0111543 A  10/2010
KR  10-2015-0055183 A   5/2015
(Continued)

OTHER PUBLICATIONS

PCT International Search Report and Written Opinion, PCT Application No. PCT/KR2019/006557, dated Sep. 10, 2019, 9 pages (with English translation of PCT International Search Report).

*Primary Examiner* — Jose L Couso
(74) *Attorney, Agent, or Firm* — WTA Patents

(57) ABSTRACT

In accordance with an aspect of the present disclosure, there is provided a method for acquiring coordinate system conversion information, the method comprising: acquiring three-dimensional information including first lane information corresponding to a lane adjacent to a vehicle, through a LiDAR installed at the vehicle, and a surrounding image including second lane information corresponding to the lane, through a camera installed at the vehicle; acquiring first coordinate system conversion information on the LiDAR and the camera by matching the second lane information with the first lane information; and acquiring second coordinate system conversion information on the vehicle and the camera by using top view image conversion information acquired based on the surrounding image, and the driving direction of the vehicle.

20 Claims, 10 Drawing Sheets

(51) Int. Cl.
*G01S 17/89* (2020.01)
*G06T 7/33* (2017.01)
*G06V 20/56* (2022.01)

(58) Field of Classification Search
CPC . G06T 5/50; G06T 7/536; G06T 2207/10016; G06T 7/246; G01S 13/931; G01S 17/89; G01S 7/4808; G01S 13/865; G01S 13/867; G01S 17/86; G01S 17/931; G01S 17/023; G01S 17/936; G01S 7/89; G01S 7/931; G01S 7/86; G01S 17/88; G01S 17/04; G01S 17/42; G01S 17/45; G01S 17/48; G06V 20/588; G06V 20/56; G06V 20/58; G06V 2201/07; G01C 21/3658; G01C 21/30; G01C 21/3407; G01C 21/3602; G05D 1/0231; G05D 1/0212; G05D 1/0236; G05D 1/024; G05D 1/0246; B60W 30/12; B60W 30/08; B60W 30/18; B60W 40/00; B60W 50/0298; B60W 2420/42; B60W 2420/52; B60W 2420/4041; B60W 30/095; B60W 30/18163; B60Q 9/008; B60R 1/00; B60R 2300/18033; B60R 2300/8093; G06F 2218/08; G08G 1/16; G08G 1/167; H04N 23/90; H04N 5/2625; B60Y 2300/12; B60Y 2300/181662

See application file for complete search history.

(56) References Cited

U.S. PATENT DOCUMENTS

| | | | |
|---|---|---|---|
| 11,768,959 B2* | 9/2023 | Viente | G06V 20/582 |
| | | | 701/28 |
| 11,772,680 B2* | 10/2023 | Shapira | G08G 1/09623 |
| | | | 701/28 |
| 2010/0098295 A1* | 4/2010 | Zhang | G08G 1/165 |
| | | | 348/148 |
| 2014/0347484 A1* | 11/2014 | Byun | G06V 20/58 |
| | | | 348/148 |
| 2014/0379247 A1* | 12/2014 | Ferguson | G06V 20/588 |
| | | | 701/301 |
| 2016/0349066 A1* | 12/2016 | Chung | G01C 21/365 |
| 2017/0003134 A1* | 1/2017 | Kim | G08G 1/09623 |
| 2018/0120859 A1* | 5/2018 | Eagelberg | G05D 1/0246 |
| 2018/0173970 A1* | 6/2018 | Bayer | G06F 18/253 |
| 2018/0224863 A1* | 8/2018 | Fu | G01C 21/3867 |
| 2018/0267172 A1* | 9/2018 | Oh | G05D 1/0278 |
| 2019/0079524 A1* | 3/2019 | Zhu | B62D 15/0255 |
| 2019/0347821 A1* | 11/2019 | Stein | G08G 1/0112 |

FOREIGN PATENT DOCUMENTS

| | | |
|---|---|---|
| KR | 10-1840974 B | 3/2018 |
| KR | 10-2018-0043610 A | 4/2018 |
| KR | 10-2018-0055292 A | 5/2018 |

* cited by examiner

APPARATUS AND METHOD FOR ACQUIRING COORDINATE CONVERSION INFORMATION

CROSS-REFERENCE TO RELATED APPLICATION

This application claims priority to Korean Patent Application No. 10-2018-0096210, filed on Aug. 17, 2018. The entire contents of the application on which the priority is based are incorporated herein by reference.

TECHNICAL FIELD

The present disclosure relates to an apparatus for acquiring coordinate system conversion information and a method for acquiring coordinate system conversion information among a vehicle, a LiDAR installed at the vehicle and a camera installed at the vehicle. For reference, this application claims priority based on a Korean patent application (No. 10-2018-0096210) filed on Aug. 17, 2018, the entire contents of which are incorporated herein by reference.

BACKGROUND

A vehicle generally refers to a transportation machine that runs on a road or track, powered by fossil fuels or electricity.

Vehicles have been developed to deliver various features to drivers along with the technological developments. Notably, in line with the trend of electrification of vehicles, vehicles with active safety systems (ASS) which are being activated in order to avoid the accident have emerged.

Furthermore, active research is currently being performed on vehicles equipped with advanced driver assist system (ADAS) which actively provides information on driving environment, such as the vehicle's status, the driver's status, and the vehicle's surroundings, in order to reduce burdens on drivers and enhance convenience for them.

An advanced driver assist system may have a detection means to detect the driving environment. For example, the detection means may include a camera and a LiDAR. The camera and the LiDAR are mounted outside or inside the vehicle, and they can detect the driving environment by acquiring images or point clouds corresponding to their mounted positions and posture angles.

SUMMARY

A problem to be solved by the present disclosure is to provide a coordinate system conversion information acquisition apparatus and method for acquiring coordinate system conversion information among a vehicle-mounted camera, LiDAR and a driving vehicle.

The problem to be solved by the present disclosure is not limited to the above-mentioned ones, and other problems not mentioned herein clearly understood by those skilled in the art from the description below will be also included in the problem to be solved by the present disclosure.

In accordance with one aspect of the present disclosure, there is provided a method for acquiring coordinate system conversion information, the method comprising: acquiring three-dimensional information including first lane information corresponding to a lane adjacent to a vehicle, through a LiDAR installed at the vehicle, and a surrounding image including second lane information corresponding to the lane, through a camera installed at the vehicle; acquiring first coordinate system conversion information on the LiDAR and the camera by matching the second lane information with the first lane information; and acquiring second coordinate system conversion information on the vehicle and the camera by using top view image conversion information acquired based on the surrounding image, and the driving direction of the vehicle.

In accordance with another aspect of the present disclosure, there is provided an apparatus for acquiring coordinate system conversion information, the apparatus comprising: a level ground identification unit configured to identify whether a vehicle is driving on level ground based on first lane information on a lane adjacent to the vehicle acquired through a LiDAR installed at the vehicle; a first coordinate system conversion information acquisition unit configured to match second lane information on the lane in a surrounding image of the vehicle acquired through a camera installed at the vehicle with the first lane information to acquire first coordinate system conversion information on the LiDAR and the camera; and a second coordinate system conversion information acquisition unit configured to acquire second coordinate system conversion information on the vehicle and the camera by using top view image conversion information acquired based on the surrounding image, and the driving direction of the vehicle.

According to the apparatus and the method for acquiring coordinate system conversion information of one embodiment of the present disclosure, it is possible to acquire coordinate system conversion information of the camera the LiDAR for a driving vehicle, without equipment or manual operation, thereby reducing the cost and time required for calibration.

DETAILED DESCRIPTION

The advantages and features of embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
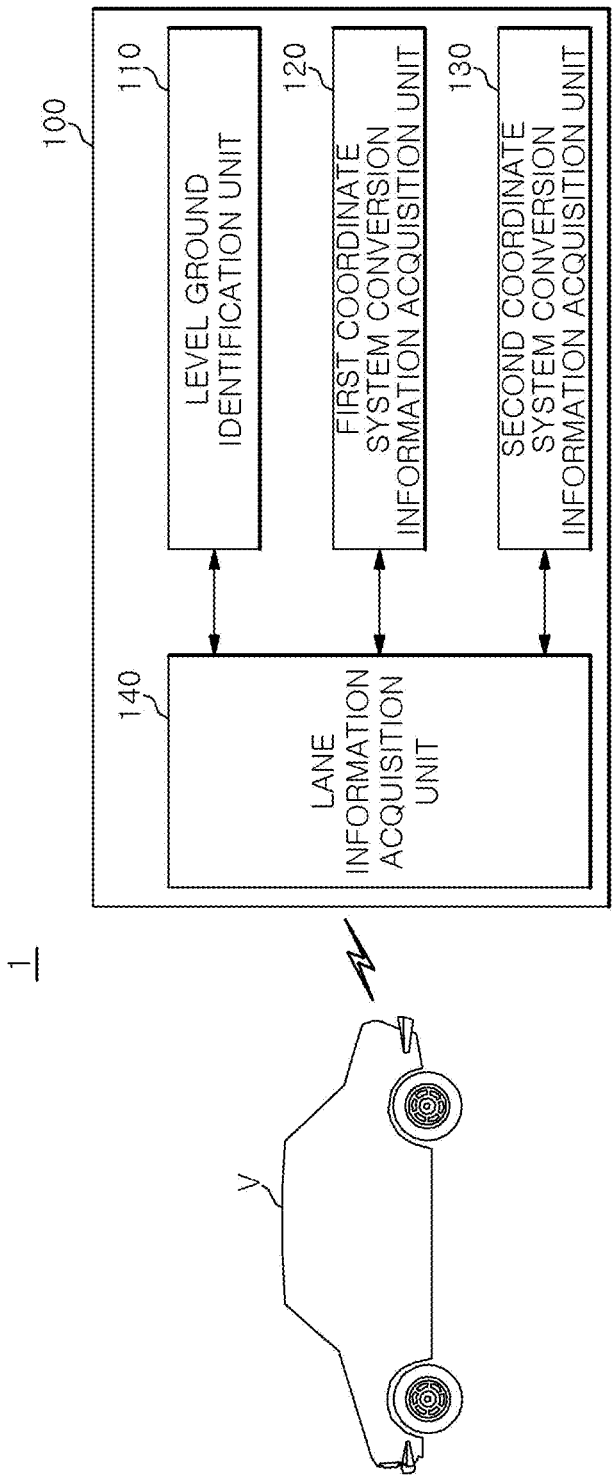
FIGS. 1 and 2 show functional block diagrams of a coordinate system conversion information acquisition system according to various embodiments.
Figure 2:
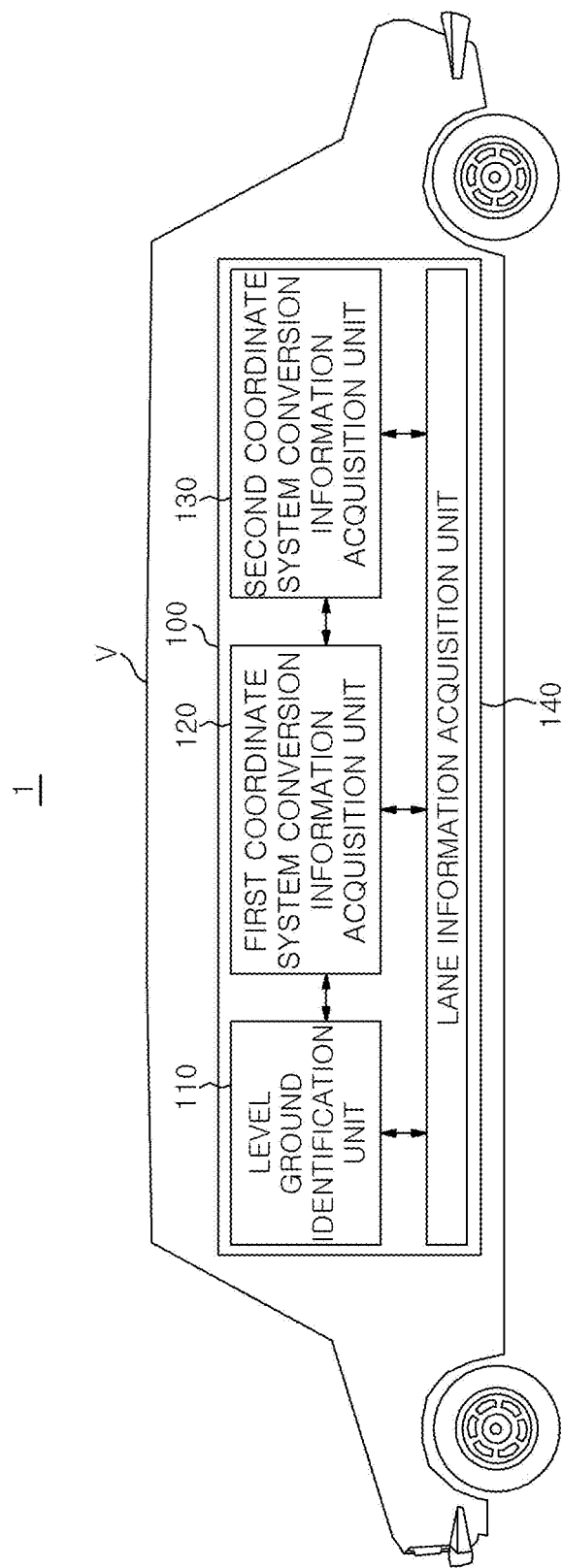
Figure 3:
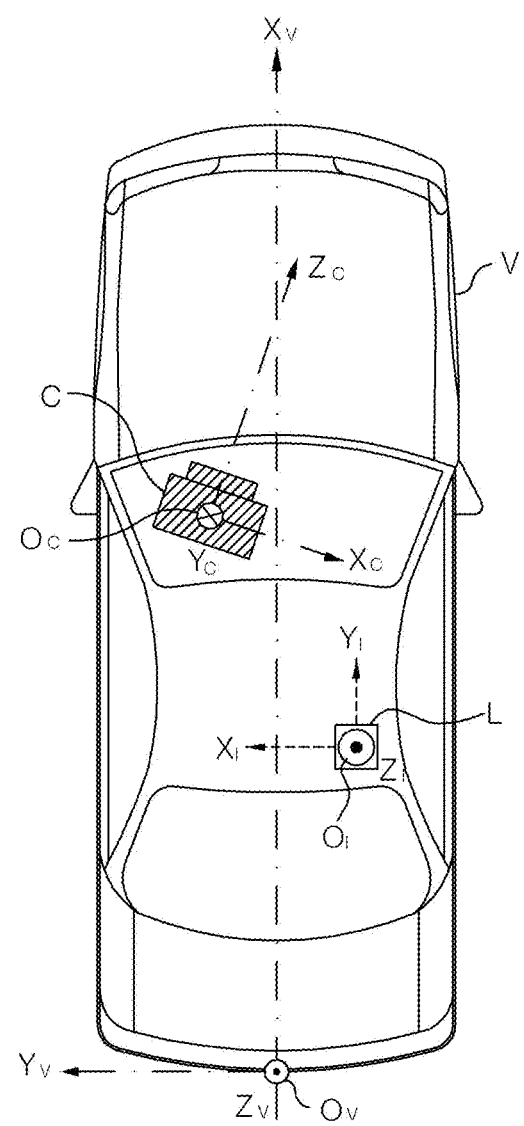
FIG. 3 is a view for explaining coordinate systems of a vehicle, camera, and LiDAR according to one embodiment.

FIGS. 1 and 2 show functional block diagrams of a coordinate system conversion information acquisition system according to various embodiments. FIG. 3 is a view for explaining coordinate systems of a vehicle, camera, and LiDAR according to one embodiment.

Referring to FIG. 1, a coordinate system conversion information acquisition system 1 according to one embodiment may comprise a vehicle V and a coordinate system conversion information acquisition apparatus 100.

The vehicle V may refer to a means of transportation that allows a human, object, or animal to travel from one place to another while driving along a road or track. According to one embodiment, the vehicle V may include a three-wheeled or four-wheeled vehicle, a two-wheeled vehicle such as a motorcycle, a construction machine, motorized equipment, a bicycle, and a train running on a track.

The vehicle V of FIG. 1 may store an accurate map in advance. Here, the accurate map may refer to a map that has high accuracy for safe and accurate control of the vehicle V and contains information on the altitude, slope, curvature, etc. of a road, as well as its plan position.

Moreover, the accurate map is a map in which at least lanes are marked out, and may additionally contain on-road facilities such as road signs, traffic lights, and guardrails.

The accurate map is composed of point clouds, each of which is a set of points acquired by scanning a road by a laser scanner or the like, and each point in a point cloud may have three-dimensional spatial coordinates in a base coordinate system. The accurate map may be constructed by filtering meaningful data from acquired point clouds by a noise filter and then marking landmarks in each point cloud.

Here, the base coordinate system refers to an orthogonal coordinate system that does not depend on any device, and may include a world coordinate system.

Also, the accurate map may be stored in the coordinate system conversion information acquisition apparatus 100 as well as in the vehicle V.

Moreover, the vehicle V of FIG. 1 may be equipped with an advanced driver assistance system (ADAS). Here, the advanced driver assistance system may refer to a system that provides driving environment information such as the vehicle V's status, the driver's status, and surrounding environment information or actively controls the vehicle V. For example, the vehicle V may be equipped with a lane departure warning system (LDWS), a lane keeping assist system (LKAS) and etc. It should be noted that the advanced driver assistance system mounted in the vehicle V is not limited to the described above.

Since the advanced driver assistance system operates in response to the driving environment information of the vehicle V, the vehicle V may comprise a detection means for detecting driving environment information provided to the advanced driver assistance system. A detection means according to one embodiment may include a radar, which detects the driving environment by emitting a pulse around the vehicle V and receiving an echo pulse reflected from an object located in that direction and/or an ultrasonic sensor, which emits an ultrasonic wave around the vehicle V and receives an echo ultrasonic wave reflected from an object located in that direction.

In addition, the vehicle V may comprise a camera C as the detection means. The camera C may be configured to face the front, side, and/or rear of the vehicle V and capture images in the corresponding directions. Captured images may become the basis for acquiring information such as lanes or road signs as well as objects around the vehicle V through image processing processes.

Hereinafter, images captured by the camera C mounted in the vehicle V are referred to as surrounding images of the vehicle, and the surrounding images may include front images captured by a camera C configured to face the front of the vehicle V, rear images captured by a camera C configured to face the rear of the vehicle V, and side images captured by a camera C configured to face the side of the vehicle V.

Furthermore, the vehicle V may further comprise a LiDAR L as the detection means. The LiDAR L may be configured to face the front, side, and/or rear of the vehicle V and emit laser light in the corresponding directions. The LiDAR L is able to detect three-dimensional information of the surroundings of the vehicle V as the driving environment information of the vehicle V by receiving laser light reflected from an object located in the direction of emission of the laser light.

In this case, the surrounding images acquired through the camera C and the three-dimensional information detected by the LiDAR L may contain information on at least two same lanes. This will be described later.

Meanwhile, the vehicle V may incorporate CAN(Controller Area Network) DATA such as steering angle information and yaw rate information which are transmitted via CAN communication, i.e., a method of communication among the camera C, the LiDAR L, and modules inside the vehicle V, and use it for controlling the vehicle V. In this case, images acquired through the camera C may comply with a camera coordinate system, point clouds acquired through the LiDAR L may comply with a LiDAR coordinate system, and CAN DATA may comply with a vehicle coordinate system.

FIG. 3 is a schematic plan view of a vehicle V according to one embodiment, which illustrates a coordinate system of the vehicle V, a coordinate system of a LiDAR L mounted in the vehicle V, a coordinate system of a camera C installed in the vehicle V, and a coordinate system of the Earth's surface R based on those coordinate systems. Referring to FIG. 3, the vehicle V may have a vehicle coordinate system consisting of an $X_V$ axis along the driving direction of the vehicle V, a $Z_V$ axis along a direction perpendicular to the Earth's surface, and a $Y_V$ axis perpendicular to the $X_V$ axis and the $Z_V$ axis, with $O_V$ as the origin. On the other hand, the LiDAR L mounted in the vehicle V may have a LiDAR coordinate system consisting of an $X_l$ axis, a $Y_l$ axis, and a $Z_l$ axis, with Oi as the origin, which are determined by its mounting position and posture angle. Also, the camera C mounted in the vehicle V may have a camera coordinate system consisting of an $X_c$ axis, a $Y_c$ axis, and a $Z_c$ axis, with $O_c$ as the origin, which are determined by its mounting position and posture angle. In addition, the coordinate system of the Earth's surface R refers to a coordinate system for a top-view image which is converted from an image acquired through the camera C, in which $O_r$ serves as the origin, an $X_r$ axis and a $Y_r$ axis are present on the Earth's surface, and a $Z_r$ axis is defined in the opposite direction of the $Z_v$ axis in the vehicle coordinate system. The coordinate systems need to be unified in order to incorporate information in the different coordinate systems, which is called calibration.

To this end, camera C and LiDAR L calibrations may be performed prior to the driving of the vehicle V. Specifically, the vehicle V may be stopped at a predetermined location, and then images and point clouds may be acquired of calibration points perceived in advance from that location. Next, the coordinates of calibration points relative to the camera coordinate system, the coordinates of calibration points relative to the LiDAR coordinate system, and the coordinates of calibration points relative to the vehicle coordinate system are compared with one another, thereby acquiring coordinate system conversion information among them.

However, the above method requires the vehicle V to be stopped correctly at a predetermined location, and also requires an accurate perception of the positions of the calibration points. This preliminary work is performed manually by a human, which poses difficulties in terms of correctness, and it will take a lot of time and cost a lot of money to achieve high accuracy. Moreover, the preliminary calibration process prior to driving needs to be performed if the camera and/or LiDAR is replaced or their position is changed.

To resolve this, a coordinate system conversion information acquisition apparatus 100 according to one embodiment may perform calibration in real time on a driving vehicle. Referring back to FIG. 1, the coordinate system conversion information acquisition apparatus 100 according to one embodiment may acquire coordinate system conversion information among the vehicle V, camera C, and LiDAR L by using information received from the driving vehicle V.

In order to receive surrounding environment information detected by the driving vehicle V, the coordinate system conversion information acquisition apparatus 100 may exchange information by communicating with the vehicle V by various well-known communication methods. The coordinate system conversion information acquisition apparatus 100 according to one embodiment may employ a well-known communication method such as CDMA, GSM, W-CDMA, TD-SCDMA, WiBro, LTE, or EPC to communicate with the vehicle V via a base station. On the contrary, the coordinate system conversion information acquisition apparatus 100 according to another embodiment may employ a communication method such as Wireless LAN, Wi-Fi, Bluetooth, Zigbee, WFD (Wi-Fi Direct), UWB (Ultra Wide Band), IrDA (Infrared Data Association), BLE (Bluetooth Low Energy), and NFC (Near Field Communication) to communicate with the vehicle V within a predetermined distance. However, the method for the coordinate system conversion information acquisition apparatus 100 to communicate with the vehicle V is not limited to the above-described embodiments.

The coordinate system conversion information acquisition apparatus 100 may acquire coordinate system conversion information based on surrounding images acquired through the camera C installed at the vehicle V and point clouds acquired through the LiDAR L. To this end, the coordinate system conversion information acquisition apparatus 100 according to one embodiment may comprise: a lane information acquisition unit 140; a level ground identification unit 110; a first coordinate system conversion information acquisition unit 120; and a second coordinate system conversion information acquisition unit 130.

The lane information acquisition unit 140 may acquire first lane information corresponding to a lane adjacent to the vehicle V, through the LiDAR L installed at the vehicle V. Specifically, the lane information acquisition unit 140 according to one embodiment may receive three-dimensional information of the surroundings of the vehicle V acquired through the LiDAR L of the vehicle V. Next, the lane information acquisition unit 140 according to one embodiment may extract first lane information on a lane on the three-dimensional information of the surroundings of the vehicle V.

The above embodiment has been described with an example in which the lane information acquisition unit 140 receives three-dimensional information acquired through the LiDAR L directly from the vehicle V. On the contrary, the lane information acquisition unit 140 according to another embodiment can only receive first lane information from the vehicle V. That is, once the vehicle V extracts first lane information from three-dimensional information acquired through the LiDAR L and then transmits the extracted first lane information to the level ground identification unit 110, the level ground identification unit 110, upon receiving it, may decide whether the vehicle V is driving on level ground or not by using the first lane information.

Moreover, the lane information acquisition unit 140 may acquire a surrounding image containing second lane information corresponding to a lane through the camera C of the vehicle V. Furthermore, the lane information acquisition unit 140 may receive second lane information extracted from the surrounding image of the vehicle V. On the contrary, the lane information acquisition unit 140 may extract second lane information directly from a received surrounding image.

In this case, the first lane information extracted from the three-dimensional information and the second lane information extracted from the surrounding image may need to include information of at least two corresponding lanes. To this end, the LiDAR L and the camera C may be mounted in the vehicle V such that they acquire three-dimensional information and a surrounding image both including at least two corresponding lanes.

In addition, the lane information acquisition unit 140 may receive three-dimensional information and a surrounding image, which are acquired through the LiDAR L and camera C of the vehicle V, respectively, at the same point in time. As a result, the three-dimensional information acquired through the LiDAR L and the surrounding image acquired through the camera C may include information on a lane present adjacent to the vehicle V. The level ground identification unit 110 may identify whether the vehicle V is driving on level ground, on the basis of first lane information of the surroundings of the vehicle V acquired through the LiDAR L of the vehicle V. When the vehicle V is driving on level ground, it is possible to achieve the accuracy of calibration using lane information on images and point clouds of the surroundings. Thus, the coordinate system conversion information acquisition apparatus 100 may identify whether the vehicle V is driving on level ground or not prior to acquiring coordinate system conversion information, through the level ground identification unit 110.

Specifically, the level ground identification unit 110 may fit a plane on the basis of first lane information acquired by the lane information acquisition unit 140, and, if the fitting error in the fitted plane is equal to or less than a predetermined reference error, it can be decided that the vehicle V is driving on level ground.

The first coordinate system conversion information acquisition unit 120 may compare the second lane information in the surrounding image of the vehicle V with the first lane information to acquire first coordinate system conversion information on the LiDAR L and the camera C. As described above, to increase the accuracy of the acquired coordinate system conversion information, the first coordinate system conversion information acquisition unit 120 may perform an operation for first coordinate system conversion information acquisition only when the vehicle V is driving on level ground.

Specifically, once the vehicle V is identified as driving on level ground by the level ground identification unit 110, the first coordinate system conversion information acquisition unit 120 according to one embodiment may extract second lane information on a lane present in the surrounding image received by the lane information acquisition unit 140. Next, the first coordinate system conversion information acquisition unit 120 may acquire first coordinate system conversion information by matching the extracted second lane information with the previously extracted first lane information.

The above embodiment has been described with an example in which the first coordinate system conversion information acquisition unit 120 is only provided with a surrounding image received by the lane information acquisition unit 140. On the contrary, the first coordinate system conversion information acquisition unit 120 according to another embodiment may receive second lane information extracted from a surrounding image from the lane information acquisition unit 140. That is, once the vehicle V extracts second lane information from a surrounding image acquired through the camera C and then transmits the extracted second lane information to the lane information acquisition unit 140, the lane information acquisition unit 140 may provide the first coordinate system conversion information acquisition unit 120 with the second lane information, along with the surrounding image, and the first coordinate system conversion information acquisition unit 120 may decide whether the vehicle V is driving on level ground or not by using the second lane information.

The second coordinate system conversion information acquisition unit 130 may acquire second coordinate system conversion information on the vehicle V and the camera C by using top view image conversion information of the surrounding image and the driving direction of the vehicle. Like the first coordinate system conversion information acquisition unit 120, the second coordinate system conversion information acquisition unit 130 may perform an operation for second coordinate system conversion information acquisition only when the vehicle V is driving on level ground.

Specifically, the second coordinate system conversion information acquisition unit 130 according to one embodiment may acquire a focus of expansion from a surrounding image, which is acquired through the camera C installed at the vehicle V and provided from the lane information acquisition unit 140, and acquire the driving direction of the vehicle V based on the acquired focus of expansion. After acquiring the driving direction of the vehicle V, the second coordinate system conversion information acquisition unit 130 may acquire the top view image conversion information by using a width of the lane and a direction of the lane, which are acquired from the first lane information. Lastly, the second coordinate system conversion information acquisition unit 130 may acquire the second coordinate system conversion information on the basis of inverse information of the top view image conversion information and the driving direction of the vehicle V.

The above embodiment has been described with an example in which the second coordinate system conversion information acquisition unit 130 receives a surrounding image acquired through the camera C from the vehicle V through the lane information acquisition unit 140. On the contrary, the second coordinate system conversion information acquisition unit 130 according to another embodiment may receive the position of the focus of expansion, along with the surrounding image, from the vehicle V through the lane information acquisition unit 140. That is, once the vehicle V identifies the position of the focus of expansion in the surrounding image acquired through the camera C and then transmits the position of the focus of expansion, along with the surrounding image, to the lane information acquisition unit 140, the lane information acquisition unit 140 provides the second coordinate system conversion information acquisition unit 130 with the received surrounding image and the position of the focus of expansion, and the second coordinate system conversion information acquisition unit 130, upon receiving it, may acquire the driving direction of the vehicle V by using the focus of expansion.

Meanwhile, although FIG. 1 illustrates that the coordinate system conversion information acquisition apparatus 100 is configured separately from the vehicle V and constitutes the coordinate system conversion information acquisition system 1, the coordinate system conversion information acquisition apparatus 100 also may be included as one component of the vehicle V.

Referring to FIG. 2, the coordinate system conversion information acquisition system 1 according to another embodiment may be configured as a vehicle V comprising the coordinate system conversion information acquisition apparatus 100. It should be noted that the coordinate system conversion information acquisition system 1 of FIG. 1 and the coordinate system conversion information acquisition system 1 of FIG. 2 operate in the same manner, except how the coordinate system conversion information acquisition apparatus 100 is configured.

Each of the components of the coordinate system conversion information acquisition apparatus 100 according to the embodiments of FIGS. 1 and 2 may be implemented as a computing device including a microprocessor—for example, at least one of a central processing unit (CPU) and a graphic processing unit (GPU). On the contrary, at least two of the components of the coordinate system conversion information acquisition apparatus 100 may be implemented as an SOC (system on chip).

The components of the coordinate system conversion information acquisition system 1 have been described so far. Referring to FIGS. 4 to 10, a coordinate system conversion information acquisition method performed by the coordinate system conversion information acquisition system 1 will be described below.

First of all, the vehicle V may acquire three-dimensional information of the surroundings of the vehicle V through the LiDAR L.

The coordinate system conversion information acquisition system 1 may identify whether the vehicle V is driving on level ground or not, on the basis of first lane information of the surroundings of the vehicle V acquired through the LiDAR L of the vehicle V. This will be described with reference to FIGS. 4 and 5.

Figure 4:
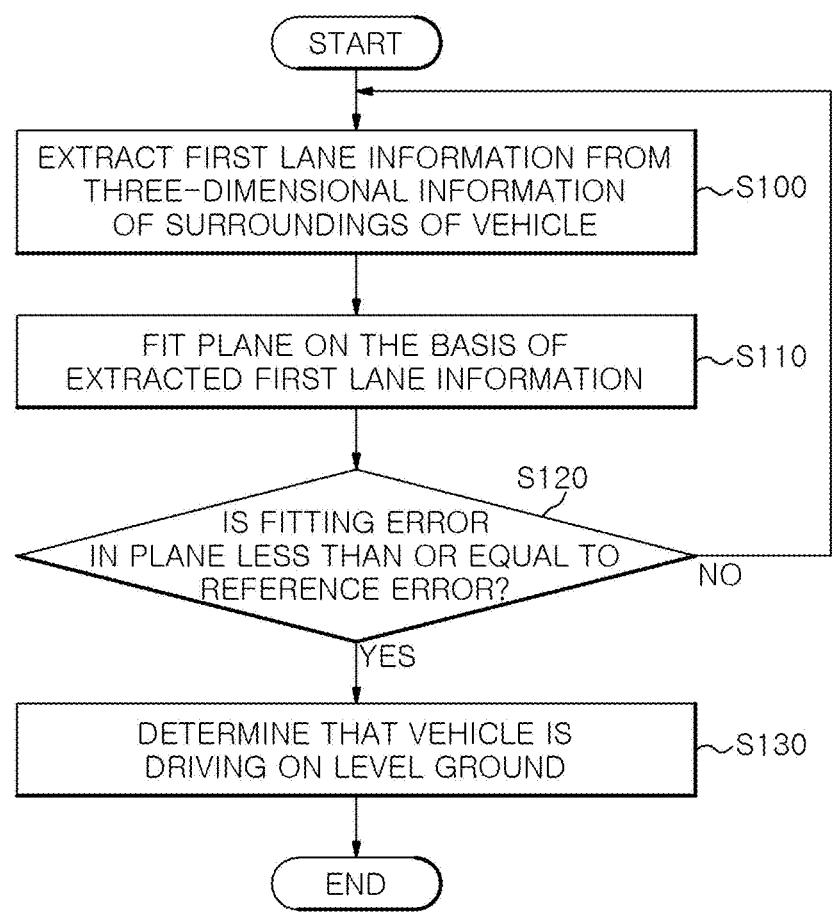
FIG. 4 is a flowchart of a method of how to identify whether a vehicle is driving on level ground or not, in a coordinate system conversion information acquisition method according to one embodiment.
Figure 5:
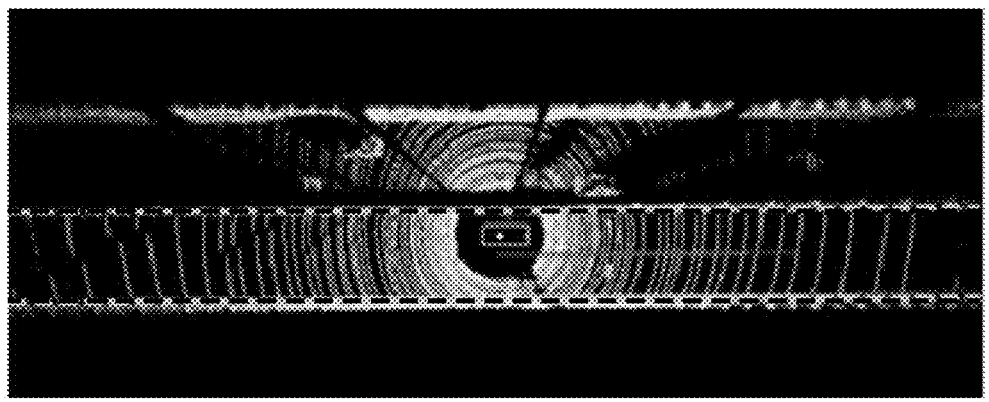
FIG. 5 is a view for explaining a method of extracting first lane information from three-dimensional information acquired through a LiDAR of a vehicle according to one embodiment.

FIG. 4 is a flowchart of a method of how to identify whether a vehicle is driving on level ground or not, in a coordinate system conversion information acquisition method according to one embodiment. FIG. 5 is a view for explaining a method of extracting first lane information from three-dimensional information acquired through a LiDAR of a vehicle according to one embodiment.

Referring to FIG. 4, first of all, the level ground identification unit 110 of the coordinate system conversion information acquisition apparatus 100 may extract first lane information from three-dimensional information of the surroundings of the vehicle V (S100). Here, the three-dimensional information may refer to point clouds which are generated by a laser reflected by an object around the vehicle V. Specifically, the LiDAR L may receive a laser reflected by an object present within a radar emission area in the surroundings, and generate a point cloud, which is a set of points whose brightness value vary with the intensity of the received laser. For example, for an object with higher laser reflectance, the LiDAR L may increase the brightness value of a point corresponding to the position of that object.

Moreover, the first lane information may comprise the curvature derivatives, curvature, direction, offset, etc. for a presumed lane area on a point cloud constituting three-dimensional information.

Because a lane area on a road around the vehicle V has higher laser reflectance than its surrounding area, the brightness value of a point corresponding to the lane area, in the three-dimensional information acquired through the LiDAR L, may be higher than that in the surrounding area. Accordingly, the level ground identification unit 110 according to one embodiment may extract first lane information on the lane on the three-dimensional information based on the brightness value patterns of points corresponding respectively to the lane area on the road and its surrounding area.

FIG. 5 is a plan view of three-dimensional information acquired through a LiDAR L configured in a vehicle V corresponding to a rectangular region in the center. In FIG. 5, a point cloud extending to the left and right can be seen, and the level ground identification unit 110 may identify the point cloud as a lane and extract first lane information about it.

To extract first lane information, the level ground identification unit 110 according to one embodiment may use one of well-known pattern recognition techniques or may use a machine learning method such as deep learning.

Although the above embodiment presumes that the step S100 is carried out by the level ground identification unit 110 of the coordinate system conversion information acquisition apparatus 100, the step S100 may be carried out by the vehicle V, and the vehicle V may transmit the first lane information to the coordinate system conversion information acquisition apparatus 100. On the contrary, the vehicle V may transmit three-dimensional information to the coordinate system conversion information acquisition apparatus 100, and the lane information acquisition unit 140 of the coordinate system conversion information acquisition apparatus 100 may then extract first lane information from the received three-dimensional information and provide it to the level ground identification unit 110.

Next, the level ground identification unit 110 of the coordinate system conversion information acquisition apparatus 100 may fit a plane on the basis of the extracted first lane information (S110). Since a lane is provided on a driving road, the driving road may be fitted onto a plane by obtaining the equation of a plane consisting of points on the first lane information corresponding to the lane. Specifically, the level ground identification unit 110 may obtain the coefficients a, b, c, and d of a plane equation ax+by+cz=d by using at least four points (on the assumption that they have coordinates (x, y, z)) constituting the first lane information.

After fitting a plane, the level ground identification unit 110 of the coordinate system conversion information acquisition apparatus 100 may compare whether the error in the fitted plane is equal to or less than a reference error or not (S120). Here, the reference error may refer to the maximum value of error that a reliable fitted plane equation has for first lane information. Specifically, the level ground identification unit 110 may obtain the fitting error according to Mathematical Formula 1:

$$FittingError = \frac{1}{n}\sum_{i=1}^{n}|ax_i + by_i + cz_i - d| \quad \text{[Mathematical Formula 1]}$$

where $(x_i, y_i, z_i)$ denote the coordinates of a point constituting i-th first lane information.

If the error in the fitted plane exceeds the reference error, the level ground identification unit 110 of the coordinate system conversion information acquisition apparatus 100 may extract first lane information over again. On the other hand, if the error in the fitted plane is equal to or less than the reference error, the level ground identification unit 110 of the coordinate system conversion information acquisition apparatus 100 may determine that the vehicle V is driving on level ground (S130).

Thus, once it is determined that the vehicle V is driving on level ground based on the first lane information, the coordinate system conversion information acquisition apparatus 100 may acquire first coordinate system conversion information on the LiDAR L and the camera C. This will be described with reference to FIGS. 6 and 7.

Figure 6:
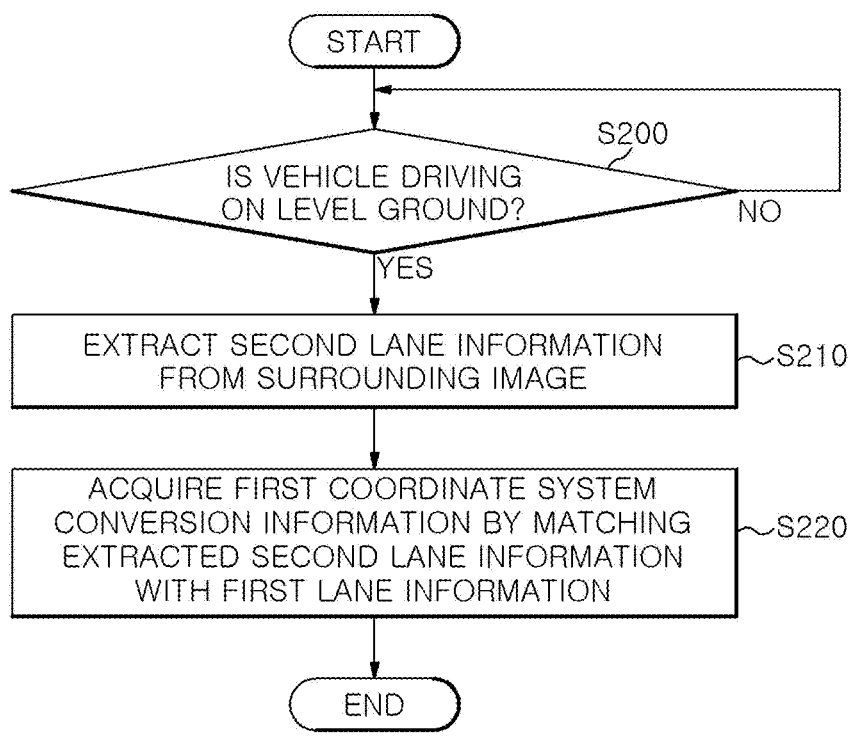
FIG. 6 is a flowchart of a method for acquiring first coordinate system conversion information, in a coordinate system conversion information acquisition method according to one embodiment.
Figure 7:
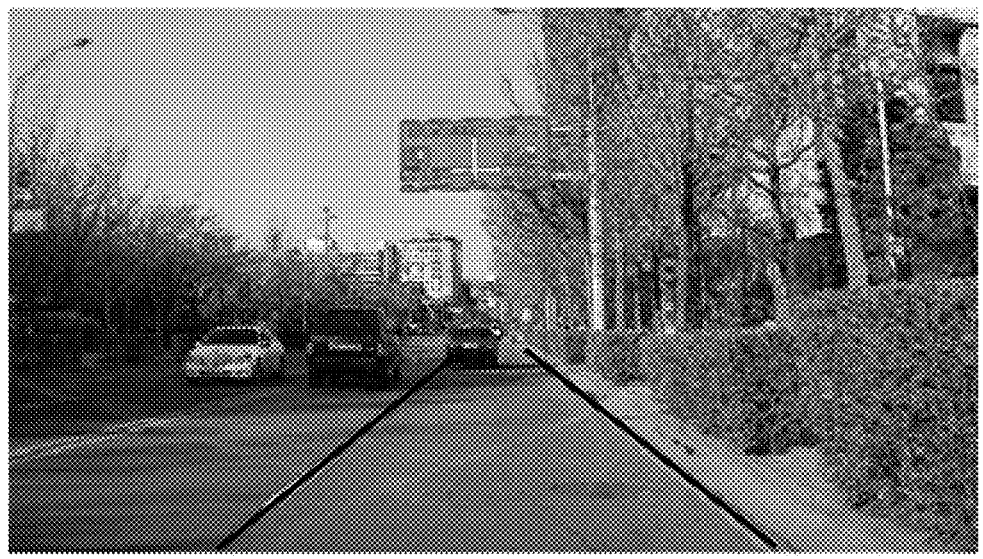
FIG. 7 is a view for explaining a method of extracting second lane information from a surrounding image acquired through a camera of a vehicle according to one embodiment.

FIG. 6 is a flowchart of a method for acquiring first coordinate system conversion information, in a coordinate system conversion information acquisition method according to one embodiment. FIG. 7 is a view for explaining a method of extracting second lane information from a surrounding image acquired through a camera of the vehicle according to one embodiment.

First of all, the first coordinate system conversion information acquisition unit 120 of the coordinate system conversion information acquisition apparatus 100 according to one embodiment may identify whether the vehicle V is driving on level ground (S200). If the vehicle V is not driving on level ground, the first coordinate system conversion information acquisition unit 120 may repeatedly identify whether the vehicle V is driving on level ground.

On the other hand, if the vehicle V is driving on level ground, the first coordinate system conversion information acquisition unit 120 according to one embodiment may extract second lane information from a surrounding image (S210). Here, the second lane information may include the curvature derivatives, curvature, direction, offset, etc. for a presumed lane area in the surrounding image.

FIG. 7 is an exemplary view of a surrounding image acquired through a camera C of a vehicle V driving on level ground. In the surrounding image of FIG. 7, white lines on a black road are seen, and the first coordinate system conversion information acquisition unit 120 may identify the white lines as a lane and extract second lane information on the lane. FIG. 7 illustrates that the lines extending in the same direction as the lane are shown in bold lines.

To extract second lane information, the first coordinate system conversion information acquisition unit 120 according to one embodiment may use one of well-known pattern recognition techniques or may use a machine learning method such as deep learning.

Although the above embodiment presumes that the step S210 is carried out by the first coordinate system conversion information acquisition unit 120 of the coordinate system conversion information acquisition apparatus 100, the step S210 may be carried out by the vehicle V, and the vehicle V may transmit the resulting second lane information to the coordinate system conversion information acquisition apparatus 100. On the contrary, the vehicle V may transmit a surrounding image to the coordinate system conversion information acquisition apparatus 100, and the lane information acquisition unit 140 of the coordinate system conversion information acquisition apparatus 100 may then extract second lane information from the received surrounding image and provide it to the first coordinate system conversion information acquisition unit 120.

Once the second lane information is extracted, the first coordinate system conversion information acquisition unit 120 may acquire first coordinate system conversion information by matching the extracted second lane information with the first lane information (S220). As described above, the first lane information and the second lane information include information on at least two corresponding lanes. Therefore, the first coordinate system conversion information acquisition unit 120 may match the first lane information and the second lane information for the corresponding lanes.

Specifically, the first coordinate system conversion information acquisition unit 120 may acquire first coordinate system conversion information between the camera C and the LiDAR L according to Mathematical Formula 2:

$$T^*_{(c,l)} = \operatorname*{argmin}_{T_{(c,l)}} \sum_k \{Z_k - h(T_{(c,l)}, P_k)\}^T (C_{Z_k} + HC_{P_k}H^T)^{-1} \{Z_k - h(T_{(c,l)}, P_k)\} \quad \text{[Mathematical Formula 2]}$$

where $T^*_{(c,l)}$, the solution of Mathematical Formula 2, denotes a three-dimensional transformation matrix representing the posture angle of the LiDAR L relative to the coordinate system of the camera C as the first coordinate system conversion information, $Z_k$ denotes the coordinates of the second lane information extracted from the surrounding image, $P_k$ denotes the coordinates of a point on the first lane information corresponding to $Z_k$, $C_{zk}$ and $C_{pk}$ denote the covariances of errors for $Z_k$ and $P_k$, respectively, and H denotes the Jacobian of a function h( ). The function h( ) may be a function that transforms $P_k$ to coordinate values in the coordinate system of the camera C by the three-dimensional transformation matrix $T_{(c,l)}$ and projects them as a two-dimensional image by the intrinsic parameters of the camera C.

To obtain $T^*_{(c,l)}$ by using Mathematical Formula 2, the first coordinate system conversion information acquisition unit 120 may perform the following steps. In the first step, the first coordinate system conversion information acquisition unit 120 may transform the coordinates of a point on the first lane information to coordinate values in the coordinate system of the camera C by using $T_{(c,l)}$, then find pixels corresponding to the second lane information in the surrounding image, and then obtain $T_{(c,l)}$ representing the posture angle of the LiDAR L relative to the coordinate system of the camera C by using Mathematical Formula 2. In the second step, the solution $T^*_{(c,l)}$ to Mathematical Formula 2 can be found by repeating the first step until the difference between the previous $T_{(c,l)}$ and the current $T_{(c,l)}$ becomes equal to or less than a threshold.

To find the solution to Mathematical Formula 2, the first coordinate system conversion information acquisition unit 120 may select at least one of well-known algorithms—for example, the Gauss Newton algorithm or the Levenberg-Marquardt algorithm.

After acquiring first coordinate system conversion information by the above-described method, the coordinate system conversion information acquisition apparatus 100 may acquire second coordinate system conversion information on the vehicle V and the camera C. This will be described with reference to FIGS. 8 to 10.

Figure 8:
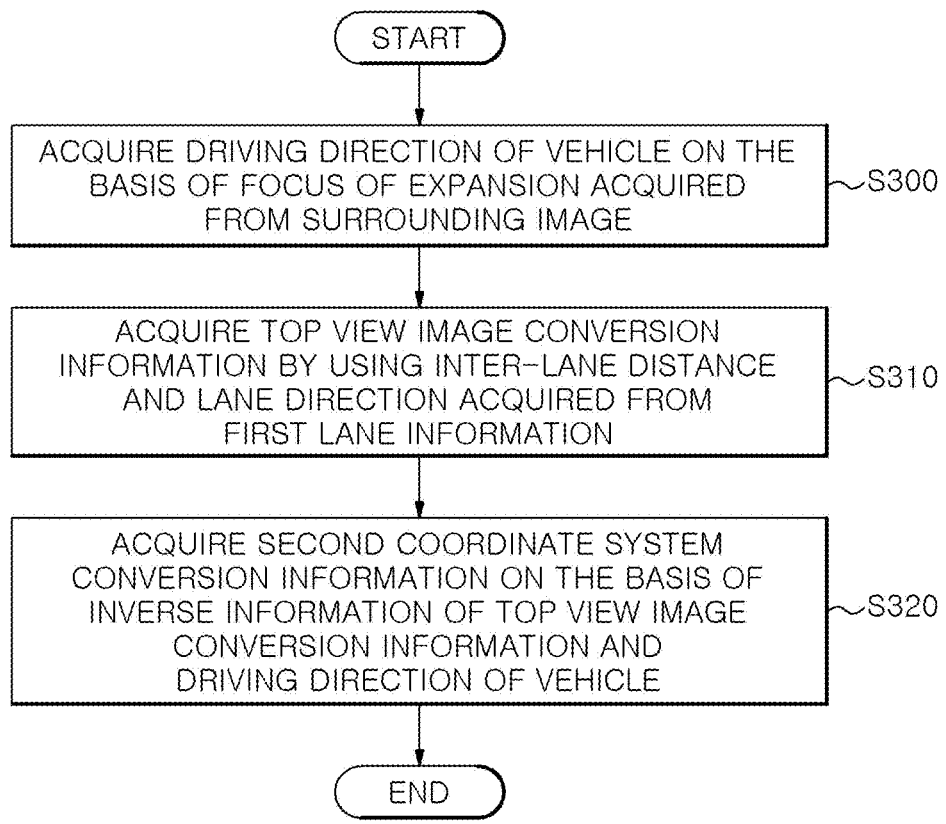
FIG. 8 is a flowchart of a method for acquiring second coordinate system conversion information, in a coordinate system conversion information acquisition method according to one embodiment.
Figure 9:
FIG. 9 is a view for explaining a method of extracting a focus of expansion from a surrounding image acquired through a camera of a vehicle according to one embodiment.
Figure 10:
FIG. 10 is a view of a top view image of a surrounding image acquired through a camera of a vehicle according to one embodiment.

FIG. 8 is a flowchart of a method for acquiring second coordinate system conversion information, in a coordinate system conversion information acquisition method according to one embodiment. FIG. 9 is a view for explaining a method of extracting a focus of expansion from a surrounding image acquired through a camera of a vehicle according to one embodiment. FIG. 10 is a view of a top view image of a surrounding image acquired through a camera of a vehicle according to one embodiment.

Referring to FIG. 8, the second coordinate system conversion information acquisition unit 130 of the coordinate system conversion information acquisition apparatus 100 may acquire the driving direction of the vehicle V on the basis of a focus of expansion in a surrounding image (S300). To this end, the second coordinate system conversion information acquisition unit 130 may decide first whether the vehicle V is driving straight ahead. Specifically, the second coordinate system conversion information acquisition unit 130 may decide whether the vehicle V is driving straight ahead, based on at least one of the steering angle and yaw rate of the vehicle V. If the absolute values of the steering angle and yaw rate of the vehicle V are less than a predetermined threshold, the second coordinate system conversion information acquisition unit 130 may decide that the vehicle V is driving straight ahead.

Once it is decided that the vehicle V is driving straight ahead, the second coordinate system conversion information acquisition unit 130 may extract a plurality of feature points in a plurality of surrounding images acquired at different time points. The second coordinate system conversion information acquisition unit 130 according to one embodiment may extract feature points in a surrounding image by using optical flow based on the Lukas-Kanade method, the results of which are as shown in FIG. 9. However, this is merely an embodiment of the method of extracting feature points in a surrounding image, and the feature point extraction method is not limited to the above-described embodiment.

Next, the second coordinate system conversion information acquisition unit 130 may acquire motion vectors for the same feature points in the plurality of surrounding images. After acquiring the motion vectors, the second coordinate system conversion information acquisition unit 130 may find the point of intersection of the motion vectors. In the case where the vehicle V is driving straight ahead, the motion vectors meet at one point, which is called the focus of expansion. Assuming that a direction perpendicular to the driving direction of the vehicle is referred to as a reference side direction, in the case where the camera C is mounted to face the driving direction relative to the reference side direction, the point of intersection of motion vectors for a plurality of feature points extracted from a plurality of surrounding images may be formed ahead of the vehicle. In this case, the second coordinate system conversion information acquisition unit 130 may determine that the point of intersection is the focus of expansion. On the other hand, in the case where the camera C is mounted to face the opposite direction of the driving direction relative to the reference side direction of the vehicle V, the point of intersection of motion vectors for a plurality of feature points extracted from a plurality of surrounding images may be formed behind the vehicle. In this case, the second coordinate system conversion information acquisition unit 130 may determine that the 180-degree rotated position of the Z coordinate of the point of intersection is the focus of expansion.

Meanwhile, when optical flow is performed, there may be errors generated due to an actual road environment. Accordingly, the second coordinate system conversion information acquisition unit 130 may find the focus of expansion by the following steps.

In the first step, the second coordinate system conversion information acquisition unit 130 may find the point of intersection of motion vectors for a feature point group consisting of k feature points in a surrounding image and acquire it as a candidate focus of expansion. In the second step, the second coordinate system conversion information acquisition unit 130 may find the number of motion vectors for the feature points in the surrounding image, that pass through the candidate focus of expansion acquired in the first step. In the third step, the second coordinate system conversion information acquisition unit 130 may repeatedly perform the first step and the second step. In the fourth step, the second coordinate system conversion information acquisition unit 130 may determine that the candidate focus of expansion the motion vectors of the largest number of feature points pass through is the focus of expansion.

On the contrary, the second coordinate system conversion information acquisition unit 130 according to another embodiment may perform the fifth step of finding another point of intersection by using all of the motion vectors for the feature points passing through the focus of expansion determined in the fourth step and selecting it as the final focus of expansion, in addition to the above-described method. Through this, the accuracy of focus-of-expansion determination may be improved.

As a result of finding a focus of expansion in FIG. 9 by the above-described process, the point P is determined as the focus of expansion.

After determining the focus of expansion based on the surrounding image, the second coordinate system conversion information acquisition unit 130 may acquire the driving direction of the vehicle V relative to the coordinate system of the camera C, on the basis of the focus of expansion. Here, the driving direction of the vehicle V may be denoted by the $X_v$ axis in the coordinate system of the vehicle V in FIG. 3. Specifically, the second coordinate system conversion information acquisition unit 130 may acquire the driving direction $X_{(c,v)}$ of the vehicle V relative to the coordinate system of the camera C according to Mathematical Formula 3:

$$\vec{x}_{(c,v)} = K^{-1} m_{FOE} \quad \text{[Mathematical Formula 3]}$$

where the vector $X_{(c,v)}$ denotes the $X_v$ axis in the coordinate system of the vehicle V relative to the coordinate system of the camera C, K denotes a 3×3 matrix for the intrinsic parameters of the camera C, and $M_{FOE}$ denotes the coordinates (u,v,1) of the focus of expansion. The vector $X_{(c,v)}$ obtained by Mathematical Formula 3 is represented as a unit vector.

After acquiring the driving direction of the vehicle V, the second coordinate system conversion information acquisition unit 130 may acquire top view image conversion information by using the width of the lane and the direction of the lane, which are acquired from the first lane information. Here, the top view image conversion information may denote a transformation matrix representing the posture angle of the camera C relative to the coordinate system of the Earth's surface which is used to convert a surrounding image to a top view image, which may be defined by Mathematical Formula 4:

$$m_{topview} = KR_{(r,c)} K^{-1} \times m_{original} \quad \text{[Mathematical Formula 4]}$$

where $m_{topview}$ denotes pixel coordinates in the top view image, K denotes a 3×3 matrix for the intrinsic parameters of the camera C, and $m_{original}$ denotes pixel coordinates in the surrounding image.

The second coordinate system conversion information acquisition unit 130 may convert the surrounding image to a top view image based on the initial value of the transformation matrix $R_{(r,c)}$, and the lanes in the top view image may be defined by a linear equation of Mathematical Formula 5:

$$x \cos \theta_i + y \sin \theta_i = r_i \quad \text{[Mathematical Formula 5]}$$

where (x,y) denotes pixel coordinates in the top view image relative to the coordinate system of the Earth's surface, and i denotes the indices of a plurality of lanes for distinguishing the lanes.

Referring to FIG. 10, white lanes exist in the top view image, and black straight lines extending in the lane direction may be given by the linear equation defined by Mathematical Formula 5.

After solving the linear equation for the lanes, the second coordinate system conversion information acquisition unit 130 may acquire top view image conversion information by using the width of the lane and the direction of the lane, which are acquired from the first lane information (S310). The first lane information in the three-dimensional information acquired through the LiDAR L includes information on the actual width of the lane, and the second coordinate system conversion information acquisition unit 130 may obtain the transformation matrix $R_{(r,c)}$ by using the parallel configuration of the lanes in the surrounding image according to Mathematical Formula 6:

$$R^*_{(r,c)} = \operatorname*{argmin}_{R_{(r,c)}} \sum_{i,j} (\theta_i - \theta_j)^2 + (d_{i,j} - |r_i - r_j|)^2 \quad \text{[Mathematical Formula 6]}$$

where i and j denotes the indices of the lanes, and $d_{i,j}$ denotes the width between the ith lane and the jth lane.

The second coordinate system conversion information acquisition unit 130 may iteratively obtain the transformation matrix $R^*_{(r,c)}$, which is the solution to Mathematical Formula 6, by repeating the above process by substituting the transformation matrix $R_{(r,c)}$ acquired by Mathematical Formula 6 into Mathematical Formula 4. That is, the second coordinate system conversion information acquisition unit 130 may obtain the transformation matrix $R^*_{(r,c)}$, which is acquired when the plurality of lanes in the top view image are parallel to one another and the width between the plurality of lanes is quite similar to the actual inter-line distance, as the solution to Mathematical Formula 6.

After acquiring top view image conversion information according to the above-described method, the second coordinate system conversion information acquisition unit may finally acquire second coordinate system conversion information on the basis of the inverse information of the top view image conversion information and the driving direction of the vehicle V (S320). Specifically, the second coordinate system conversion information acquisition unit 130 may acquire the posture angle $R_{(c,v)}$ of the vehicle V relative to the coordinate system of the camera C, which is the second coordinate system conversion information, according to Mathematical Formula 7:

$$R_{(c,r)} = [\vec{X}_{(c,r)}, \vec{Y}_{(c,r)}, \vec{Z}_{(c,r)}]$$

$$\vec{Y}_{(c,v)} = (-\vec{Z}_{(c,r)} \times \vec{X}_{(c,v)})$$

$$\vec{Z}_{(c,v)} = \vec{X}_{(c,v)} \times \vec{Y}_{(c,v)}$$

$$R_{(c,v)} = [\vec{X}_{(c,v)}, \vec{Y}_{(c,v)}, \vec{Z}_{(c,v)}] \qquad \text{[Mathematical Formula 7]}$$

where $R_{(c,r)}$ denotes the inverse of the transformation matrix $R_{(r,c)}$, i.e., top view image conversion information, $X_{(c,v)}$ denotes the $X_v$ axis in the coordinate system of the vehicle V relative to the coordinate system of the camera C, as the driving direction of the vehicle V, and the symbol 'x' denotes the cross product of two vectors. Referring to FIG. 7, the vector Y(c,v) and the vector Z (c,v) are acquired by the cross product of given vectors, and may be represented as a unit vector.

According to the above-described process, once the first coordinate system conversion information and the second coordinate system conversion information are acquired, the coordinate system conversion information acquisition apparatus 100 may acquire third coordinate system conversion information between the vehicle V and the LiDAR L by using the first coordinate system conversion information and the second coordinate system conversion information. Through this, calibration may be done among the vehicle V, the camera C, and the LiDAR L.

The above-described apparatus and method for acquiring coordinate system conversion information allow for acquiring coordinate system conversion information of a camera and LiDAR for a driving vehicle, without equipment or manual operation, thereby reducing the cost and time required for calibration and acquiring accurate coordinate system conversion information.

Meanwhile, each of the steps included in the above-described coordinate system conversion information acquisition method according one embodiment may be implemented in a computer-readable recording medium for storing a computer program which is programmed to perform these steps.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to one embodiment, the above-described apparatus and method for acquiring coordinate system conversion information are industrially applicable because they can be used in various fields such as in the home or industry.

What is claimed is:

1. A method for acquiring coordinate system conversion information, the method comprising:
    acquiring three-dimensional information including first lane information corresponding to a lane adjacent to a vehicle, through a LiDAR installed at the vehicle, and a surrounding image including second lane information corresponding to the lane, through a camera installed at the vehicle;
    extracting the first lane information from the three-dimensional information;
    fitting a plane based on the extracted first lane information; and
    acquiring first coordinate system conversion information on the LiDAR and the camera by matching the second lane information with the first lane information using the fitted plane.

2. The method of claim 1, further comprising:
    responsive to error of fitting the plane is equal to or less than a predetermined reference error, determining that the vehicle is driving on a ground level, and
    wherein the acquiring of the first coordinate system conversion information is performed when the vehicle is determined to be driving on the ground level.

3. The method of claim 2, wherein the acquiring of the first coordinate system conversion information comprises:
    extracting the second lane information from the surrounding image.

4. The method of claim 1, further comprising:
    acquiring second coordinate system conversion information on the vehicle and the camera by using top view image conversion information acquired based on the surrounding image and driving direction of the vehicle.

5. The method of claim 4, wherein the acquiring of the second coordinate system conversion information comprises:
    acquiring the driving direction of the vehicle by using a focus of expansion acquired based on the surrounding image;
    acquiring the top view image conversion information by using a width of the lane and a direction of the lane, which are acquired from the first lane information; and
    acquiring the second coordinate system conversion information based on inverse information of the top view image conversion information and the driving direction of the vehicle.

6. The method of claim 5, wherein the acquiring of the driving direction of the vehicle comprises:
    acquiring motion vectors for respective feature points in a plurality of surrounding images including the surrounding image acquired at different times;
    determining the focus of expansion based on a point of intersection of the acquired motion vectors; and
    acquiring the driving direction of the vehicle by using the determined focus of expansion and intrinsic parameter of the camera.

7. The method of claim 4, further comprising:
    determining, based on at least one of steering angle and yaw rate of the vehicle, whether the vehicle is driving straight ahead or not,
    wherein the acquiring of the second coordinate system conversion information is performed when the vehicle is determined to be driving straight ahead.

8. The method of claim 6, wherein the determining of the focus of expansion comprises:
acquiring a plurality of candidate focuses of expansion based on the point of intersection of the acquired motion vectors for respective different feature point groups, among the plurality of feature points; and
determining a candidate focus of expansion which has the most number of motion vectors passing through the candidate focus of expansion among the plurality of candidate focuses of expansion as the focus of expansion in the surrounding image.

9. The method of claim 5,
wherein the top view image conversion information includes transformation matrix used for transforming the surrounding image into a top view image,
wherein the transformation matrix minimizes differences between a width of a lane in the top view image and a width of a corresponding lane in the surrounding image and between a direction of the lane in the top view image and that of the corresponding lane in the surrounding image.

10. The method of claim 4, further comprising acquiring third coordinate system conversion information on the vehicle and the LiDAR based on the first coordinate system conversion information and the second coordinate system conversion information.

11. An apparatus for acquiring coordinate system conversion information, the apparatus comprising:
one or more processors; and
memory storing instructions thereon, the instructions when executed by the one or more processors cause the one or more processors to:
identify whether a vehicle is driving on a ground level based on first lane information on a lane adjacent to the vehicle acquired through a LiDAR installed at the vehicle;
acquire three-dimensional information including first lane information corresponding to a lane adjacent to a vehicle through the LiDAR, and a surrounding image including second lane information corresponding to the lane through a camera installed at the vehicle;
extract the first lane information from the three-dimensional information;
fit a plane based on the extracted first lane information; and
match second lane information on the lane in a surrounding image of the vehicle acquired through a camera installed at the vehicle with the first lane information to acquire first coordinate system conversion information on the LiDAR and the camera.

12. A non-transitory computer readable recording medium for storing instructions, when executed by a processor to cause the processor to perform a method for acquiring coordinate system conversion information, the method comprising:
acquiring three-dimensional information, which includes first lane information corresponding to a lane adjacent to a vehicle, through a LiDAR installed at the vehicle, and a surrounding image, which includes second lane information corresponding to the lane, through a camera installed at the vehicle;
extracting the first lane information from the three-dimensional information;
fitting a plane based on the extracted first lane information; and
acquiring first coordinate system conversion information on the LiDAR and the camera by matching the second lane information with the first lane information using the fitted plane.

13. The non-transitory computer readable recording medium of claim 12, the method further comprising:
responsive to an error of fitting the plane is equal to or less than a pre-determined reference error, determining that the vehicle is driving on a ground level, and wherein the acquiring the first coordinate system conversion information is performed when the vehicle is determined to be driving on the ground level.

14. The non-transitory computer readable recording medium of claim 13, wherein the acquiring of the first coordinate system conversion information comprises:
extracting the second lane information from the surrounding image.

15. The non-transitory computer readable recording medium of claim 12, the method further comprising:
acquiring second coordinate system conversion information on the vehicle and the camera by using top view image conversion information acquired based on the surrounding image and driving direction of the vehicle.

16. The non-transitory computer readable recording medium of claim 15, wherein the acquiring of the second coordinate system conversion information comprises:
acquiring the driving direction of the vehicle by using a focus of expansion acquired based on the surrounding image;
acquiring the top view image conversion information by using a width of the lane and a direction of the lane, which are acquired from the first lane information; and
acquiring the second coordinate system conversion information based on inverse information of the top view image conversion information and the driving direction of the vehicle.

17. The non-transitory computer readable recording medium of claim 16, wherein the acquiring of the driving direction of the vehicle comprises:
acquiring motion vectors for respective feature points in a plurality of surrounding images including the surrounding image acquired at different times;
determining the focus of expansion based on a point of intersection of the acquired motion vectors; and
acquiring the driving direction of the vehicle by using the determined focus of expansion and intrinsic parameter of the camera.

18. The non-transitory computer readable recording medium of claim 15, the method further comprising:
determining, based on at least one of steering angle and yaw rate of the vehicle, whether the vehicle is driving straight ahead or not,
wherein the acquiring the second coordinate system conversion information is performed when the vehicle is determined to be driving straight ahead.

19. The non-transitory computer readable recording medium of claim 17, wherein the determining of the focus of expansion comprises:
acquiring a plurality of candidate focuses of expansion based on the point of intersection of the acquired motion vectors for respective different feature point groups, among the plurality of feature points; and
determining a candidate focus of expansion which has the most number of motion vectors passing through the candidate focus of expansion among the plurality of candidate focuses of expansion as the focus of expansion in the surrounding image.

20. The non-transitory computer readable recording medium of claim 16,
- wherein the top view image conversion information includes transformation matrix used for transforming the surrounding image into a top view image,
- wherein the transformation matrix minimizes differences between a width of a lane in the top view image and that of a corresponding lane in the surrounding image and between a direction of the lane in the top view image and that of the corresponding lane in the surrounding image.

* * * * *